United States Patent
Weidl

(10) Patent No.: US 8,216,477 B2
(45) Date of Patent: Jul. 10, 2012

(54) PROTEIN SKIMMER FOR SALT-WATER AQUARIUM

(75) Inventor: Wolfgang Weidl, Delmenhorst (DE)

(73) Assignee: DELTEC GmbH, Delmenhorst (DE)

( * ) Notice: Subject to any disclaimer, the term of this patent is extended or adjusted under 35 U.S.C. 154(b) by 473 days.

(21) Appl. No.: 12/581,969

(22) Filed: Oct. 20, 2009

(65) Prior Publication Data

US 2010/0096307 A1    Apr. 22, 2010

(30) Foreign Application Priority Data

Oct. 22, 2008  (DE) .......................... 10 2008 052 739

(51) Int. Cl.
 *B01D 35/34* (2006.01)
 *B01D 35/157* (2006.01)

(52) U.S. Cl. ... 210/703; 210/136; 210/151; 210/167.25; 210/167.26; 210/188; 210/614; 210/615; 210/620

(58) Field of Classification Search .......................... None
See application file for complete search history.

(56) References Cited

U.S. PATENT DOCUMENTS

| | | | | |
|---|---|---|---|---|
| 5,122,267 A | * | 6/1992 | Giovanetti et al. | 210/188 |
| 5,484,525 A | * | 1/1996 | Mowka, Jr. | 210/167.26 |
| 5,736,034 A | * | 4/1998 | Phillips et al. | 210/167.26 |
| 6,436,295 B2 | * | 8/2002 | Kim | 210/703 |
| 7,624,969 B2 | * | 12/2009 | Schletz et al. | 261/36.1 |
| 2010/0051520 A1 | * | 3/2010 | Marks et al. | 210/95 |

* cited by examiner

*Primary Examiner* — Krishnan S Menon
*Assistant Examiner* — Dirk Bass
(74) *Attorney, Agent, or Firm* — Andrew Wilford

(57) ABSTRACT

An apparatus for removing organics from water has an upwardly open and downwardly closed column having a tubular side wall and a floor and a generally closed chamber on the floor of the column and forming with the side wall an upwardly open annular space. The column has an outlet opening into the annular space. A pump forces water containing organics into the chamber and thereby fills the column with water that then flows out of the column through the outlet. An aerator pump moves at least some of the water containing organics out of the chamber, mixes the pumped-out water with bubbles, and pumps the water and bubbles back into a downwardly and horizontally closed but upwardly open flow space in the column above the chamber. A skimmer clears the organics from the surface of the water above the flow space.

8 Claims, 1 Drawing Sheet

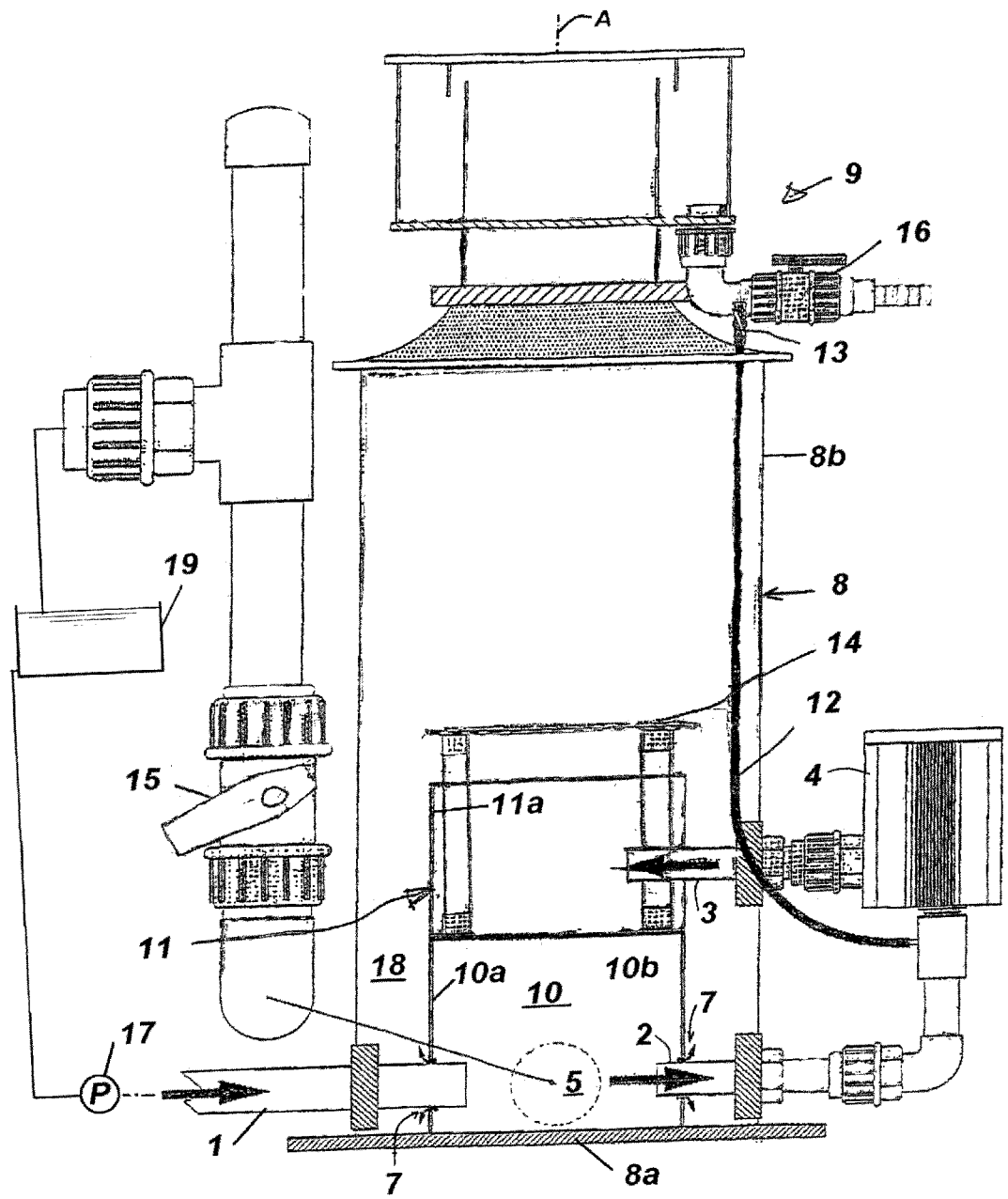

PROTEIN SKIMMER FOR SALT-WATER AQUARIUM

FIELD OF THE INVENTION

The present invention relates to an apparatus for removing organics from the water of aquariums or similar vessels, a so-called protein skimmer that foam fractionates the aquarium water.

BACKGROUND OF THE INVENTION

A typical protein skimmer comprises an upwardly open and downwardly closed tubular column having an inlet for contaminated water and an outlet for clean water. A bypass through an aerating pump has an intake that pulls in water from the column and an output that reinjects this water mixed with air bubbles back into the column. A scum collector is typically provided at the top of the column. Thus the organic solids in the dirty water stick to the bubbles and rise to the surface of the water where the bubbles dissipate, leaving the organics as scum that can be separated and disposed of. Such an apparatus is predominantly used in a salt-water aquarium.

Such a fractionater typically has a column of circular section and is oriented such that its open upper end is above the level of the water in the aquarium. The inlet for contaminated water from the aquarium is in the upper region of the column, the outlet for clean water back to the aquarium is in the lower end of the column, and the skimmer outlet is a bubbler in the lower region of the column above the outlet. Thus the water being purified flows slowly downward countercurrent to the rising bubbles. The aerating pump is preferably mounted outside the column and has a separate air inlet port open above the water level by means of which it draws in air for mixing with the water circulating through the pump. Another pump slowly moves the aquarium water into the column through the inlet and out via the outlet, typically returning the clean water to the bottom of the aquarium.

In the conventional design, the supply of contaminated water into the upper region of the column housing is restricted. This is because if the water moved too briskly, turbulence would occur near the upper region of the in the skimmer so that the air bubbles or the foam forming as a result, would not be stable enough to remove the organics, but the air bubbles would burst and the organics would remain in the water. As a result, a controlled skimming operation could not be ensured. If the contaminants bound to the air bubbles were washed back into the aquarium of the system, undesired consequences would ensue, which means that special bacteria or algae would develop, which would be extremely stable and could be removed from the aquarium only with difficulty.

In addition it is disadvantageous that the contaminated water fed into the column from the aerating pump is already mixed with cleaned water, which limits the overall skimming performance of the skimmer. Furthermore, the pump can also aspirate more or less air from the skimming area itself, which means from the column, which may lead to a non-uniform and reduced amount of air in the air suction adapter, which would have a detrimental effect on the desired skimming operation.

OBJECTS OF THE INVENTION

It is therefore an object of the present invention to provide an improved apparatus for removing organics from water, in particular a protein skimmer for a salt-water aquarium.

Another object is the provision of such an improved apparatus for removing organics from water, in particular a protein skimmer for a salt-water aquarium that overcomes the above-given disadvantages, in particular that allows a good removal of organics to be achieved and that precludes any backwashing of contaminants and a feeding in of any contaminants via the outlet for cleaned water into the aquarium or the like.

SUMMARY OF THE INVENTION

An apparatus for removing organics from water has according to the invention, an upwardly open and downwardly closed column having tubular side wall and a floor and a generally closed chamber on the floor of the column and forming inside the column with the side wall an upwardly open annular space. The column has an outlet opening into the annular space adjacent the floor. A pump circulates water containing organics into the chamber and thereby fills the column with water that flows out of the column through the outlet. An aerator pump moves at least some of the water containing organics out of the chamber, mixes the pumped-out water with bubbles, and pumps the water and bubbles back into a downwardly and horizontally closed but upwardly open flow space in the column above the chamber. is Thus bubbles capture the organics in the water and rise from the flow space to a surface of the water filling the column. A skimmer clears the organics from the surface of the water above the flow space.

Thus a closed and also cylindrical chamber is provided in the usually cylindrical column on close to its floor. This chamber has a bottom wall, a closed top wall and closed side walls. The inlet for contaminated water opens directly into this closed chamber. An intake pipe extends from this chamber directly to the suction side of the aerating pump. The contaminated water may be supplied under pressure, for example through a suitable pump, the delivery rate of which may be greater than the delivery rate of the aerating pump sucking the contaminated water out of the chamber.

In order to be able to carry off any excess water, the pipe feeding dirty water into the chamber and/or the pipe sucking it out is/are not fitted through the wall of the chamber in a sealed manner, but gaps are provided at these ports that serve to let the overpressurized water in the chamber to flow out. Alternatively or additionally, further passage gaps or openings may be formed in the chamber wall or the like, if needed. The chamber has a radial spacing from the surrounding wall of the column. The water aspirated by the aerating pump is fed into the flow space immediately above the chamber and having a floor formed by the top wall of the chamber, as well as closed side walls. The flow space is open upwardly. The water fed into this flow space through the aerating pump together with the air bubbles can thus rise and can also keep the corresponding organics on the air bubbles in a nonturbulent state even at high delivery rates and transport them to the skimmer chamber provided at the top of the column, where the foam is dried and the sediments are collected, while clean water flows back into the column or remains therein.

The clean water will pass out of the column through the outlet close to the bottom. This water may in turn be carried off for example by means of a pump or simply be displaced downward out of the column by the water being pumped in from the aquarium. Either way, this clean water is fed back to the aquarium or the like. The outlet for the cleaned water is located in the annular gap formed between the chamber and the actual column wall. According to the invention, the water volume fed into the additional chamber may be several times larger than the volume that can be sucked in by the aerating pump. Any excess water may escape from the feed-in chamber through the corresponding openings, slots or the like. This way, a positive pressure is created in the chamber.

Of particular advantage here is that the overall air performance, i.e. the formation of air bubbles, is increased, since the contaminated water is no longer just sucked in by the aerating pump, in the course of which losses through flow friction would develop, but the water is fed to the pump under is positive pressure, so that the pump operation is supported. In addition, only contaminated water is fed into the aerating pump, as a result of which the overall skimmer performance is increased, since no partially skimmed water can be circulated back through the pump or can be sucked in by the pump.

Furthermore the water that is fed in, i.e. that is fed to the aerating pump, is free of bubbles, so that an optimal, undisturbed generation of air bubbles is made possible in the aerating pump.

Moreover, the described apparatus enables a very compact design to be achieved, in which a markedly higher skimmer performance compared to the prior art is achieved. Altogether, this means a more cost-effective production and a more cost-effective operation. A particular advantage is also achieved in that it is almost impossible that any contaminants already bound in the air bubbles may be washed back into the aquarium system, so that the undesired consequences resulting therefrom cannot occur.

In a manner per se known an air supply line is connected to the suction port of the aerating pump.

In order to make the rising up of the air bubbles from the flow space more uniform and to make it more uniform across the entire cross section of the column above the mouth of the flow space, a perforated plate or grid structure is disposed in the column above the flow space adjacent to the chamber.

In a manner per se known a check valve is integrated into the outlet line for cleaned water.

Also in a manner per se known a control/check valve is integrated into the air supply line.

BRIEF DESCRIPTION OF THE DRAWING

A preferred embodiment example of the invention is illustrated in the sole FIGURE of the drawing showing the invention partly diagrammatically and in a vertical section and described in more detail below.

SPECIFIC DESCRIPTION

The apparatus for removing organics from the water of a salt-water aquarium 19 or the like comprises a tubular and cylindrical column 8 centered on a vertical axis A, closed at the bottom, and open at the top. The column 8 has an inlet conduit or pipe 1 through which a pump 17 feeds contaminated water into the column 8, an outlet 5 for cleaned water leading back to the aquarium 19, an intake conduit or pipe 2 connected to the suction side of an aerating pump 4 and an output 3 connected to the pressure side of the pump 4 for feeding water enriched with air drawn in through a line 12 connected to an air intake 13 back into the column 8. A standard scum collector or skimmer 9 is provided at the top of the column 8.

According to the invention, a closed chamber 10 is provided at the bottom inside the column 8. It has a cylindrical side wall 10a downwardly closed by a floor 8a of the column 8 and a planar and closed top wall 10b. The inlet pipe 1 from the pump 17 and aquarium 19 and the intake pipe 2 for the aerating pump 4 both pass through ports in the side wall with some play, that is a gap 7, level with each other. The side wall 10a forms an upwardly open annular space with the side wall 8b of the column 8 into the bottom of which the return or outlet 5 for cleaned water opens.

The contaminated water is supplied via the inlet 1 under pressure by the pump 17 at a rate (volume/time) somewhat greater than the rate at which the pump 4 pulls water out of the chamber 10. Thus the chamber 10 is overpressurized and water escapes from it in the gaps 7 around the pipes 1 and 2, making it impossible for water to enter the chamber 10 through these gaps.

On top of the chamber 10 is a flow space 11 whose floor is formed by the imperforate top wall 10b of the chamber 10 and whose cylindrical side wall 11a is also closed, but that is open at the top. The output 3 of the pump 4 opens into the lower region of this flow space, feeding contaminated water mixed with tiny bubbles into this flow space. This bubbles hold organic solids in the water by surface tension and rise. This action plus the fact that water is being pumped into the bottom of the flow space ensures that the liquid/gas/solid mixture therein rises. The bubbles with their entrained solids move to the top where they can be skimmed off by the device 9.

The thus cleaned can then flow downward water in the annular gap or space 18 to exit the column 8 through the outlet 5 and return to the aquarium 19. Thus according to the invention the flow of cleaned water fed to the outlet 5 or pumped out through it and the flow of contaminated water and rising air bubbles are completely separate from one another. Thus the formation of air bubbles, the collection of organics on the air bubbles and the rising of the air bubbles are unobstructed. It is therefore almost impossible that any contaminants already bound to the air bubbles is washed back into the aquarium 19 because the cleaned water carried off through the intake 5 will not hinder or affect any air bubbles or the rising up thereof.

In order to even the flow of the air bubbles rising in the column 8, a perforated plate or grid 14 is mounted above the flow space 11 on top of the chamber 10. In addition, a manually operated check valve 15 may be integrated in a manner per se known into the outlet line for cleaned water. Also, a control/check valve may be provided in the air line 12. Finally, a valve 16 may be connected to the skimmer device 9 to empty it. The invention provides a particularly compact apparatus which achieves a high performance.

The invention is not limited to the embodiment shown but may be varied in many ways within the scope of the disclosure. All of the novel, individual and combinatory features disclosed in the description and/or the drawings are regarded as essential to the invention.

I claim:

1. An apparatus for removing organics from water, the apparatus comprising;
    an upwardly open and downwardly closed column having tubular side wall and a floor;
    a generally closed chamber on the floor of the column and forming inside the column with the side wall an upwardly open annular space, the column having an outlet opening into the annular space adjacent the floor;
    a first pump for pumping water containing organics into the chamber and thereby filling the column with water that flows from the outlet;
    structure forming a downwardly and horizontally closed but upwardly open flow space in the column above the chamber;
    a second pump connected to the chamber and having an air intake for pumping at least some of the water containing organics out of the chamber, mixing air drawn in through the intake with the pumped-out water to form bubbles therein, and pumping the water and bubbles back into the flow space, whereby bubbles capture the organics in the water and rise from the flow space to a surface of the water filling the column; and means for skimming the organics from the surface of the water above the flow space.

2. The apparatus defined in claim 1 wherein the chamber forms a narrow opening through which water inside the chamber can escape from the chamber into the annular space.

3. The apparatus defined in claim 2 wherein the first pump for pumping water into the chamber operates at a greater flow rate than the second pump for pumping water out of the chamber, whereby the chamber is overpressurized.

4. The apparatus defined in claim 2 wherein at least one of the pumps includes a pipe extending into the chamber and the chamber is formed with a port forming the opening around the pipe.

5. The apparatus defined in claim 4 wherein the first and second pumps each have such a pipe and the chamber has a respective such port forming a respective such opening with each of the pipes.

6. The apparatus defined in claim 1, further comprising a check valve connected to the air intake.

7. The apparatus defined in claim 1, further comprising a perforated plate or grid up overlying and partially upwardly closing the flow space.

8. The apparatus defined in claim 1, further comprising a check valve connected to the outlet.

* * * * *